March 1, 1966    E. J. H. BENTZ    3,237,614
ENGINE COOLING SYSTEM
Filed Sept. 22, 1964
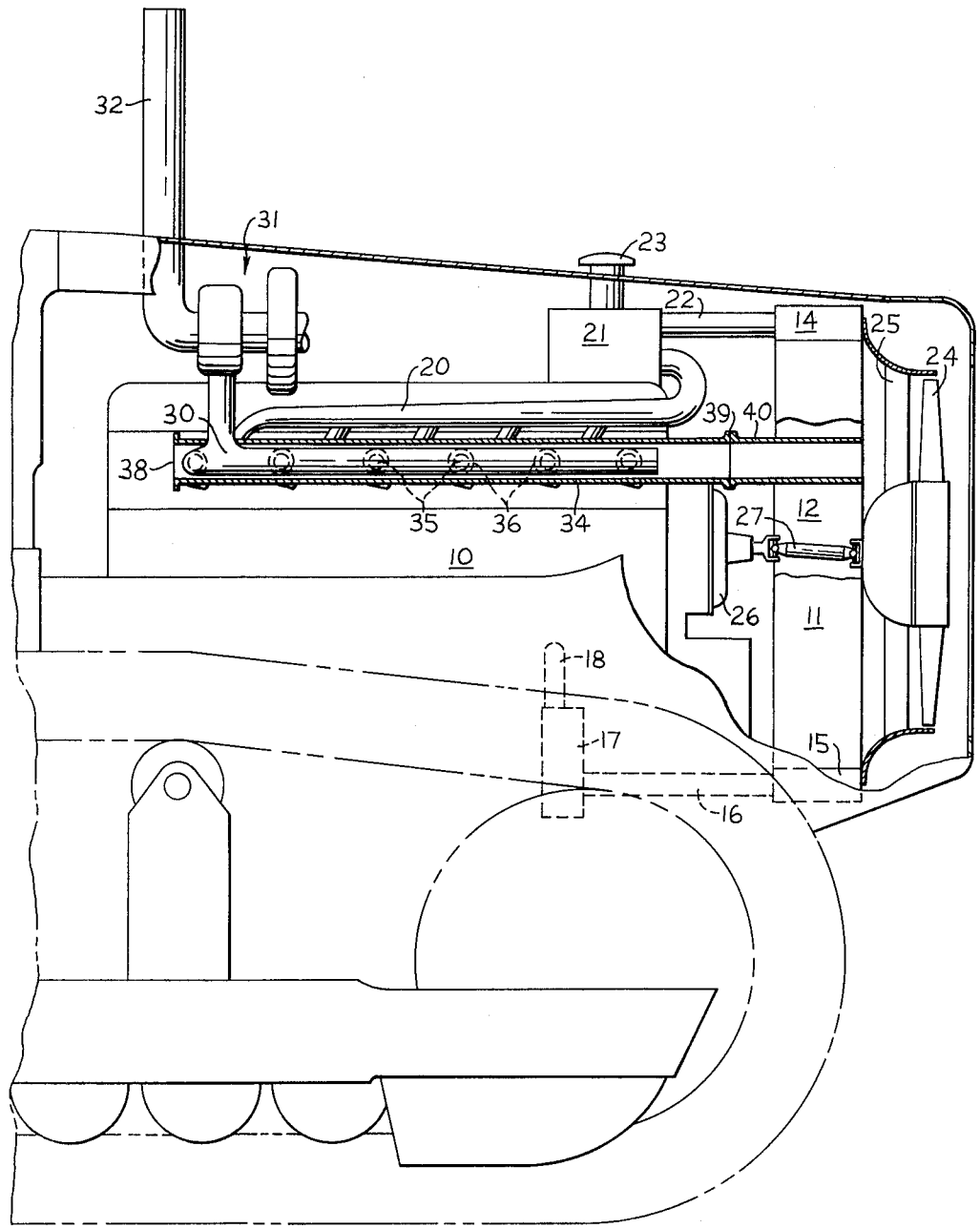
INVENTOR.
ERWIN J. H. BENTZ
BY
Fryer and Zimwald
ATTORNEYS

United States Patent Office 3,237,614
Patented Mar. 1, 1966

3,237,614
ENGINE COOLING SYSTEM
Erwin J. H. Bentz, Washington, Ill., assignor to Caterpillar Tractor Co., Peoria, Ill., a corporation of California
Filed Sept. 22, 1964, Ser. No. 398,229
4 Claims. (Cl. 123—41.49)

This invention relates to the type of engine cooling system in which liquid engine coolant is circulated through a radiator type heat exchanger to reduce its temperature, and particularly to improvements in this kind of system where air acting as the secondary or cooling fluid at the radiator is caused to travel in close proximity to the engine.

Many engines, particularly on vehicles in the earth moving field, employ front mounted radiators of conventional type except that the direction of the fan is reversed to draw air through the radiator core from the rear and direct it forwardly. This avoids the abrasive and destructive effect of the dust and debris-laden air often present in front of the radiator as during the operation of a bulldozer, loader or other vehicle mounted implement. However, it has the undesirable effect that, upon drawing the air from the immediate vicinity of the engine, radiant heat from the engine, and particularly the exhaust manifold thereof, is acquired by the ambient air reducing its efficiency as a cooling agent at the radiator.

Engine horsepower is being increased in many makes of tractors and the like, calling for larger cooling systems which include greater radiator size. This results in undesirable bulk and in many cases reduces operator visibility.

It is, therefore, the object of the present invention to increase the efficiency of cooling systems of the kind described by isolating radiant engine heat and preventing it from increasing the temperature of ambient air utilized at the engine radiator.

The invention is described in detail by reference to the accompanying drawing and in the description further and more specific objects and advantages of the invention are made apparent.

The drawing is a schematic view of the forward end of a track-type tractor illustrating an engine with a cooling system embodying the present invention.

The engine 10 is associated with a radiator which, in the present case, comprises two vertically disposed cores or tube bundles shown at 11 and 12 with a central vertical space between them. Water from a top tank shown at 14 which serves both tube bundles, flows downwardly through the tubes to a bottom tank 15, thence to a conduit 16, to a pump 17, and into the engine block through a conduit 18. Having absorbed heat from the operation of the engine, the water flows outwardly from the cylinder head into a manifold 20 by which it is directed to an expansion tank 21 and, through a conduit 22, back to the top tank 14. The expansion tank is provided with a capped inlet 23 for the purpose of supplying water to the system. A high speed fan 24 is arranged in front of the radiator and draws air through the tube bundles and through vanes shown at 25. The fan in the present case happens to be driven by a fluid coupling 26 at the forward end of the engine and a flexible drive connection as shown at 27. The drive connection extends through the space between the two tube bundles 11 and 12.

Since in the arrangement described, the air which acts as a coolant at the radiator, is drawn through the engine compartment and in direct contact with the engine and particularly the hot exhaust manifold thereof, consider-able heat is absorbed which raises the temperature of the ambient air and reduces the efficiency of heat exchange at the radiator. The present invention comprises means for isolating the exhaust manifold, which is the hottest part of the engine, and preventing admixture of air in its immediate vicinity with the ambient air which passes through the radiator. As shown in the drawing the exhaust manifold 30 of the engine is connected so that the exhaust therefrom drives a conventional turbocharger, generally indicated at 31, from which the exhaust gases are vented through a stack indicated at 32.

In accordance with the present invention the exhaust manifold is surrounded by a tubular shroud 34 throughout its length. Connections between the individual engine cylinders and the exhaust manifold are indicated in dotted lines at 35 and the tubular connecting members extend through somewhat larger openings in the shroud indicated by dotted lines at 36. Thus spaces are provided which permit entry of air into the shroud. The shroud is also open at its rear end as indicated at 38, and at its forward end has a flanged connection 39 with an extension 40 which passes forwardly through the space between the two tube bundles of the radiator. Consequently suction of the fan 24 draws air through the shroud 34 and extension 40 expelling it forwardly of the radiator where it does not contact the radiator or have an opportunity to become admixed with ambient air which is passing through the radiator. As a consequence the greatest part of the heat from the exhaust manifold, which is the hottest part of the engine, is expelled at a point remote from the flow of ambient air which acts as a secondary coolant in the heat exchanging process taking place at the radiator, and as a consequence a smaller and less compact radiator system may be used for an engine of any given size and output.

One reason for the flanged connection shown at 39 is to enable removal of the extension 40 and capping of the forward end of the shroud 34 in cold weather. In this case a blower may be secured to the opposite flanged end 30 of the shroud and the heated air therein directed to the vehicle operator's cab to increase the temperature therein.

I claim:

1. In an engine cooling system including a radiator disposed adjacent an engine and having means to circulate engine coolant through the radiator, a fan for drawing air from the vicinity of the engine through the radiator to absorb heat of the coolant therein and shroud means enclosing the major portion of the exhaust manifold of the engine to prevent contact of such air with said manifold.

2. The combination of claim 1 in which the shroud means has an outlet on the upstream side of the fan to induce the outflow of hot air therefrom.

3. The combination of claim 1 in which the fan is at one end of the engine and the radiator is between the engine and fan and in which the shroud means extends through the radiator to a point upstream of the fan.

4. The combination of claim 3 in which the shroud means is of generally tubular form and open at both ends.

References Cited by the Examiner

UNITED STATES PATENTS

| | | | |
|---|---|---|---|
| 1,432,060 | 10/1922 | Gough. | |
| 1,873,379 | 8/1932 | Frentzel | 123—41.49 |
| 3,043,390 | 7/1962 | Lattay | 123—41.49 X |

KARL J. ALBRECHT, *Primary Examiner.*